United States Patent [19]

Mittleman

[11] 4,133,204
[45] Jan. 9, 1979

[54] ROUGHNESS DIAGNOSTIC TOOL

[75] Inventor: John Mittleman, Panama City, Fla.

[73] Assignee: The United States of America as represented by the Secretary of the Navy, Washington, D.C.

[21] Appl. No.: 906,180

[22] Filed: May 15, 1978

[51] Int. Cl.² ............................................. G01B 5/28
[52] U.S. Cl. .................................................. 73/105
[58] Field of Search ............................ 73/105, 9, 10

[56] References Cited

U.S. PATENT DOCUMENTS

| 4,019,379 | 4/1977 | Wartelle et al. | 73/105 |
| 4,081,989 | 4/1978 | Majcherczyk | 73/105 |

Primary Examiner—Anthony V. Ciarlante
Attorney, Agent, or Firm—Richard S. Sciascia; Harvey A. David

[57] ABSTRACT

A roughness measuring tool wherein a pair of discs are mounted in spaced parallel relation for rotation by a motor about a common axis with a face of only one of the discs being exposed to a layer of fluid contacting a surface to be tested. A torsionally resilient coupling beteen the discs permits rotational displacement due to a difference in hydrodynamic drag thereon. The displacement is sensed as a phase difference between signals generated by rotation of the discs and a phase signal is applied to a function generator the output of which is displayed as a figure of merit of test surface condition.

12 Claims, 5 Drawing Figures

U.S. Patent    Jan. 9, 1979    Sheet 1 of 2    4,133,204

ROUGHNESS DIAGNOSTIC TOOL

BACKGROUND OF THE INVENTION

This invention relates generally to the field of surface roughness measurement, and more particularly to the determination of the extent of fouling by marine growth on a ship hull, and the hydrodynamic effect thereof.

Inspection of ship hulls to determine the condition thereof has generally been carried out visually be divers. Limited use has been made of profilometers adapted to underwater use, of stereophotogrammetry, and of surface impressions taken with clay or other plastic material.

Determinations made by those techniques provide, of course, certain valuable information. However, translation thereof to provide an interpretation of the hydrodynamic effect of the condition on hull performance is largely subjective, colored by experience of the investigator and, at best provides an unreliable measure of hull condition.

There has existed a need for a diagnostic tool that could be used by divers to obtain a rapid, direct, and reliable measure of the degree of ship hull fouling and its effect on the performance of the vessel.

Various devices have been proposed for testing or measuring the degree of roughness of the surfaces of materials. In addition to profilometers, mentioned above, pneumatic devices have been proposed that measure roughness by detecting the amount of air flow from a nozzle or sensing head disposed against the surface to be tested. While those devices are suitable for determining roughness of paper or the like, they are not adaptable to the problem, addressed by the present invention, of determining marine fouling and other roughness producing conditions of ship hulls, such as rust, corrosion, and coating deteriorations, while in the water, and of measuring the hydrodynamic effect thereof.

SUMMARY OF THE INVENTION

With the foregoing in mind, it is a principal object of this invention to overcome the aforementioned problem and shortcomings of the prior art, and to provide an improved surface condition diagnostic tool for underwater use.

Another object of this invention is to provide a roughness measuring device that is simple and reliable in operation and which can provide consistent and repeatable measurements or results in the hands of relatively unskilled and inexperienced operators.

As another object, the invention aims to provide a roughness diagnostic device that is rugged, inexpensive, and portable.

Yet another object is to provide a tool or device of the foregoing character that utilizes hydrodynamic principles in operation in combination with a function generator to provide an output in the form of a figure of merit, whereby the use of emprical formulae and concepts to derive meaningful data from non-hydrodynamic measurements and observations are avoided.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
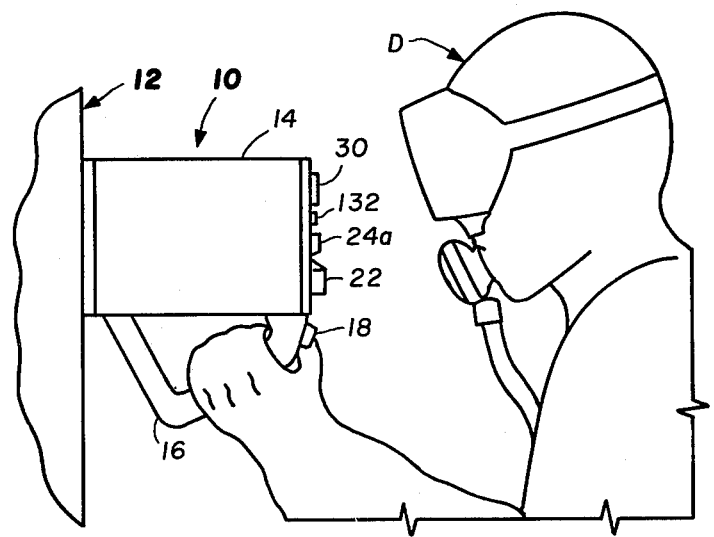
FIG. 1 is an elevational view of a device, embodying the invention, for measuring the roughness of an underwater surface and shown in a position of use against a ship hull.

Referring first to FIG. 1, a roughness measuring device 10 is illustrated as being held in a position of use against a ship hull 12 by a driver D for the purpose of determining the condition of the surface of the hull. Surface conditions affecting the measurement include fouling by marine growth, rust, corrosion, or deterioration of hull coastings. The device 10 is operable, under water, to hydrodynamically obtain a direct reading, or figure of merit, for the condition of the surface being inspected. The figure of merit can be directly related to effects of hull condition on ship operating speeds, fuel efficiency, and the like.

The device 10 comprises a generally cylindrical housing, conveniently formed of aluminum or other rigid, light weight material that is resistant to corrosion. The housing 14 includes a handle 16 for ease in carrying and positioning of one end of the device against the surface 11. A thumb or finger operated button 18 is conveniently located on the handle for actuation of a switch that is used to initiate operation of the device in a manner later described in detail. On the end opposite the surface engaging end of the housing 14 are a plurality of controls including a mode selector switch knob 22, and a plurality of calibration input knobs 24a, 24b, 24c, and 24d. A numerical readout or display means 30, is also located at that end for viewing by the operator.

Figure 2:
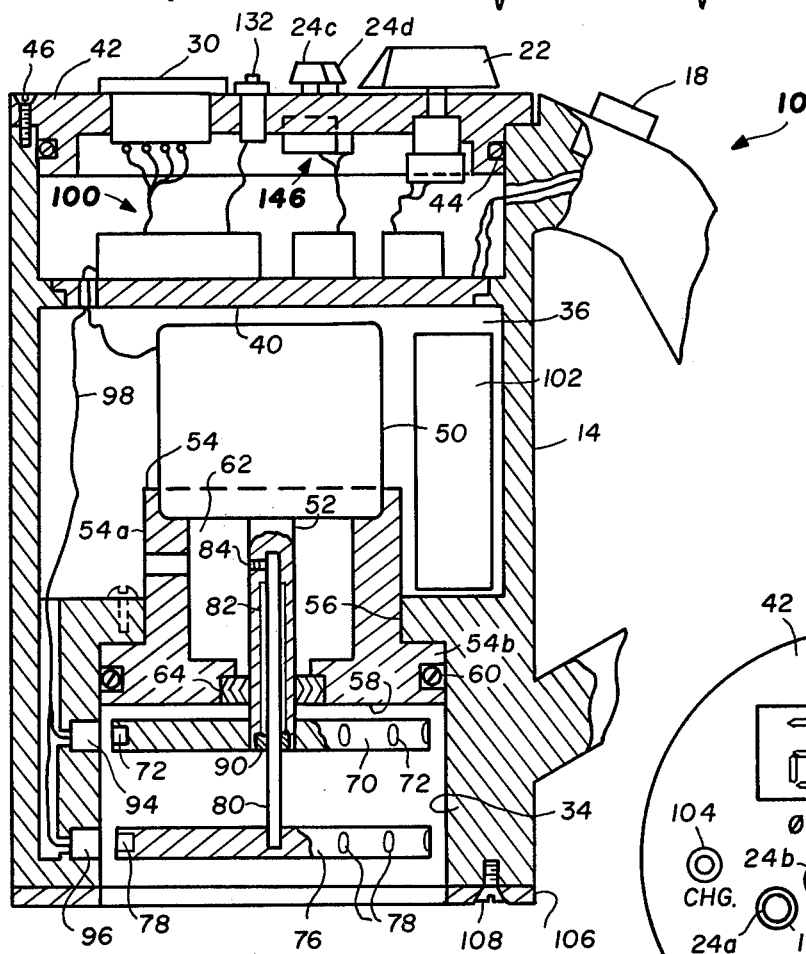
FIG. 2 is an enlarged sectional view of the device of FIG. 1.
Figure 3:
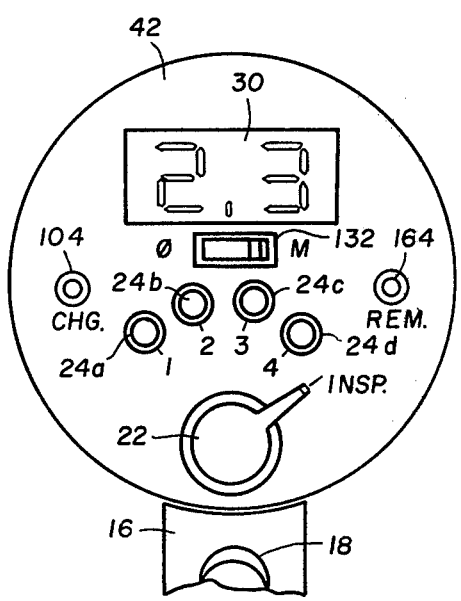
FIG. 3 is an operator's end view of the device.

Referring now to FIGS. 2 and 3, the housing 14 comprises a cylindrical recess 34 opening into the test surface engaging end of the housing, and a watertight chamber 36 that is separated by a wall portion 38 from the recess 34. The chamber 36 is divided by an electronic component carrying panel or board 40 and is closed by an end cover 42. Cover 42 is conveniently sealed relative to the housing 14 by an O-ring 44 and secured by screws 46.

Housed within the chamber 36 is a variable speed, direct current, electric motor 50 having a tubular rotary output shaft 52. The motor 50 is carried or seated in a motor mount member 54 comprising a cylindrical portion 54a that is received in an opening 56 in wall portion 38 of the housing 14, and a flange portion 54b that is received in the recess 34. The flange portion 54b presents a flat circular end surface 58 to the recess 34 and carries an O-ring 60 for sealing the motor mount member 54 relative to the housing 14.

The motor shaft 52 extends through a central bore 62 in the mount member 54, and through a shaft seal 64 therein, into the recess 34.

Fixed to the end of the shaft 52, for rotation therewith, is a reference disc 70, conveniently formed of aluminum, brass or other non-magnetic material, and carrying a plurality of small magnets 72 in the periphery thereof. A second, or hydrodynamic drag sensing disc 76, formed of a non-magnetic material and having peripheral magnets 78, is disposed in spaced parallel, coaxial relation to the first, or reference disc 70.

The disc 76 is further connected to the shaft 52, and hence disc 70, by torsionally resilient coupling means that permits rotational displacement of the discs relative to one another about their common axis of rotation. To this end, the disc 76 is fixed to the outer end of a slender torsion member or rod 80. The rod 80 extends into the lumen 82 of the tubular shaft 52 and has its inner end securely fixed, as by a setscrew 84 accessible through an opening 86 in the motor mount member 54. A bearing 90 in the end of the shaft 52 aids in preventing whipping of the torsion rod 80, in use.

The motor mount member 52, motor 50, and discs 70, 76 can be conveniently withdrawn from the housing 14 as an assembly for servicing or adjustment.

Recessed into the side of the housing 14 defining the recess 34 are a pair of magnetic pick-ups 94 and 96 adapted to cooperate with the magnets 72, 78, respectively, of the discs 70, 76 to generate first and second electrical signals, each comprising a series of pulses at a frequency corresponding to the speed of rotation of the motor shaft 52 and the discs during operation of the device. Because of differences in hydrodynamic drag on the surfaces of discs 70 and 76, due in part to the character and condition of the surface of the hull 12 against which the device is held, and because of the resilient torsional connection between the discs, there will exist a difference in phase between the first and second output signals from the pick-ups 94 and 96, respectively. That phase difference can be taken as a measure of the hull surface condition and used to generate a figure of merit M therefor. The pick-up output signals are carried by suitable conductors 98 to electronic components generally indicated at 100 and mounted on the panel 40. These components form part of the electronic circuitry later described in more detail with reference to FIG. 4.

A direct current power supply in the form of a rechargeable battery 102 is located with the motor 50 in chamber 36, and is conveniently charged through the agency of a suitable jack 104 in cover 42.

The surface engaging end of the housing 14 is provided with an annular shoe 106, secured by screws 108, preferably of a hard material. The shoe 106 establishes the distance between the exposed surface of the sensing disc 76 and the surface being inspected. The shoe 106 can be removed and replaced with a similar shoe of different thickness to select the just mentioned distance.

Figure 4:
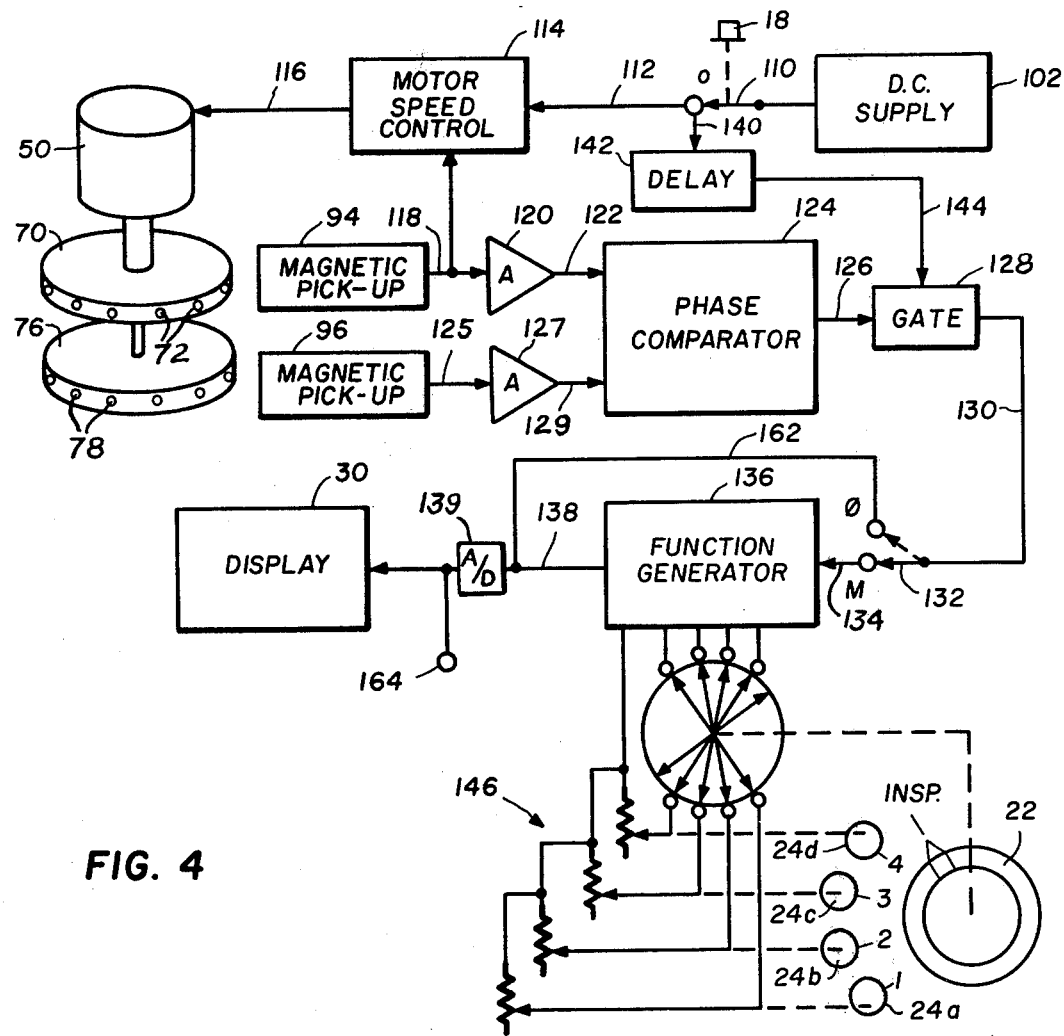
FIG. 4 is a diagrammatic illustration, in block form, of an electronic circuit forming part of the device.

Referring now to FIG. 4, the D.C. power supply 102 is adapted to be connected, through a switch 110 under control of the push-button 18, via line or conductor 112, a motor speed governing control 114, and line 116 to the motor 50. Although the governor 114 is illustrated as of the frequency responsive type, other, mechanically actuated switch types can also be used. When the switch 110 is open, the motor 50 is deenergized, and when the switch is closed the motor is energized to drive the reference and sensing discs 70, 76 in rotation to generate the mentioned phase differing first and second signals.

The magnetic pick-up 94 has its output connected, as shown by line 118, an amplifier 120, and line 122 to one input of a phase detector or comparator 124. Similarly, the magnetic pick-up 96 has its output connected, as shown by line 125, an amplifier 127, and line 129 to another input of the phase comparator 124. The comparator 124 may comprise any of a number of well known constructions that will provide an output signal representative of the phase difference $\phi$ between two input signals of like frequency.

The comparator output on line 126 is adapted to be fed via a gate 128, line 130, a switch 132, and line 134 to a function generator 136. The function generator 136 may comprise any of a number of conventional devices for providing an output signal, on line 138, that is representative of a figure of merit M value that is a predetermined function of the phase $\phi$ input via line 134. This signal is applied via an analog to digital converter 139 to the display 30 which provides a direct visual read-out of the figure of merit to the user.

The gate 128 is adapted to pass the output of phase comparator 124 to the function generator 136 only after the motor 50 has achieved a predetermined governed operating speed under the control of governor 114. Accordingly, the power supply is connected, as shown by switch 110 and line 140 to a delay means 142, the output of which is connected by line 144 to the gate 128. Upon closing of switch 110 by push-button 18, a voltage is applied via line 140 to the delay means 142. After a predetermined time period has elapsed following actuation of the push-button 18, and during which the speed of the motor becomes stabilized, the delay means 142 enables gate 128 to pass the phase difference output of the comparator 124 to the function generator 136.

Figure 5:
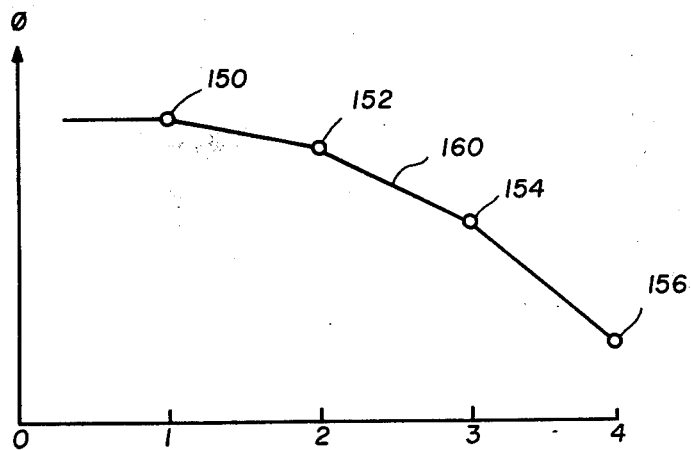
FIG. 5 is a graphical illustration of a synthesized function representing the relation of phase difference to a figure of merit.

In one embodiment of the invention, the phase difference output $\phi$ of the comparator 124 is in analog form and the function generator 136 conveniently comprises a diode function generator of a well known type having a plurality of break-points in the function approximation that are determined by a plurality of resistance means. A discussion of such function generators may be found on page 51 of the publication "Applications Manual for Computing Amplifiers for Modelling Measuring Manipulating & Much Else" (Library of Congress Card No. 66-19610) of Philbrick Researches, Inc., Dedham, MA., a commercial supplier of such devices. Those break points are represented at 150, 152, 154 and 156 in FIG. 5, and establish a synthesized curve 160 representing a figure of merit M of hull condition as a function of the phase difference $\phi$ representing the rotational displacement between discs 70 and 76. In the present example the resistances, represented at 146 in FIG. 2 are adjustable by means of the calibrating knobs 24a -24c to select the break points and determine the figure of merit function for a particular inspection job as will be described later.

The display 30 is preferably of the light emitting diode digital read-out type that is easily read by a diver in conditions of poor visibility. Switch 132 permits by pass of the function generator visibility. Switch 132 permits by pass of the function generator 136 via line 162, to permit a readout corresponding directly to phase $\phi$, if desired. A terminal 164 is provided for connection of the device 10 to a read-out display or recorder at a remote station on the vessel being inspected, dock or the like, for viewing by supervisory personnel.

MODE OF OPERATION

In preparation for running an inspection of the hull 12, the device is calibrated in the following manner, using a plurality of calibrating surfaces (not shown) having different degrees of roughness or representative fouling conditions. With the calibrating surfaces submerged in water and the recess 34 flooded, the shoe 106 of the device 10 is first positioned against a first calibrating surface having, for example, the characteristics of the hull with no fouling or coating deterioration. With the mode selector switch knob 22 in the number 1 position pointing to calibration knob 24a, the button 18 is depressed. When the motor 50 has stabilized at the predetermined governed speed, a matter of seconds, the gate 128 will be enabled to pass the phase φ signal from comparator 124 to the function generator 136. The latter will provide an output, depending upon the adjustment of knob 24a, which output will result in a numerical read-out on display 30. The knob 24a is then adjusted until the numerical read-out corresponds to an assigned figure of merit for a surface having the condition of the first calibrating surface, say a figure of merit of 1.0, and the button 18 then released. This process establishes the break-point 150 of the curve 160, the other resistances controlled by knobs 24b, 24c, and 24d being rendered ineffective by the position of the mode selector switch.

The device 10 is then moved to a second surface having a condition selected to represent a figure of merit of 2.0. With the mode selector in the number 2 position, the button 18 is depressed and, when a display appears, the knob 24b is adjusted to provide a display of 2.0 to establish the break-point 152 of curve 160.

A similar process is repeated for each of third and fourth calibrating surfaces.

Thereafter, with the mode selecting knob 22 in the inspect position and the recess 34 filled with water, the device may be placed on the underwater surface of hull 12, the botton 18 depressed, and when running speed of the motor is stabilized, a figure of merit for the surface under inspection will appear on display 30. For example, as shown in FIG. 3 a figure of merit of 2.3 is displayed indicating a surface condition between the conditions of the second and third calibration surfaces.

The invention thereby provides a rapid, accurate, and reliable device for effecting a quantitative inspection and analysis of the condition of a ship's hull. With this device, a single diver can make a rapid survey involving selected test sites on the ship hull. By utilizing the remote readout, and suitable recording thereof periodic inspections can be readily made and the results compared to determine rate of change in hull condition.

Although the comparator 124 and function generator 136 have been described as being analog in character, many examples of those elements being known to those skilled in the art, it will be understood that the digital equivalents of those components are also well known. Accordingly, the invention contemplates the use of a digital comparator and/or a digital function generator.

It will be recognized that although a particular torsionally resilient coupling means, in the form of tubular shaft 52 and rod 80, has been described, other known torsionally resilient couplings can be used without departing from the spirit of the invention.

It will also be recognized that well known equivalents of the magnets and magnetic pick-ups can be used to sense the rotation of the discs and their relative positions. For example, photo-electric sensor means could sense reflection of light from facets on the discs to generate the desired signals.

Obviously, other embodiments and modifications of the subject invention will readily come to the mind of one skilled in the art having the benefit of the teachings presented in the foregoing description and the drawing.

It is, therefore, to be understood that this invention is not to be limited thereto and that said modifications and embodiments are intended to be included within the scope of the appended claims.

What is claimed is:

1. A device for measuring roughness of a surface, said device comprising:
   a housing;
   a motor mounted in said housing and having a rotary shaft;
   a first disc mounted on said shaft for rotation about an axis substantially normal to a test surface;
   a second disc disposed in coaxial parallel relation to said first disc;
   torsionally resilient means for coupling said second disc to said first disc;
   said housing comprising means for holding said second disc in predetermined spaced relation to said test surface with a fluid medium therebetween; and
   means for determining rotational displacement of said second disc relative to said first disc corresponding to drag resulting from test surface conditions when said discs are rotated by said motor.

2. A device as defined in claim 1, and further comprising:
   governor means for stabilizing the speed of said motor and said discs.

3. A device defined in claim 2, and wherein said means for determining rotational displacement comprises:
   first sensor means, responsive to rotation to said first disc, for generating a first signal having a predetermined frequency characteristic;
   second sensor means, responsive to rotation of said second disc, for generating a second signal having a predetermined frequency characteristic; and
   comparator means, responsive to said first and second signals, for providing a third signal representative of phase difference between said frequency characteristics of said first and second signals.

4. A device as defined in claim 3, and further comprising:
   function generator means, responsive to said third signal, for providing a fourth signal representative of a figure of merit of the roughness condition of said test surface.

5. A device as defined in claim 4, and further comprising:
   display means, responsive to said fourth signal, for providing a visual display of said figure of merit.

6. A device as defined in claim 3, and further comprising:
   display means, responsive to said third signal, for providing a visual display representative of said phase difference.

7. A device as defined in claim 5, and wherein:
   said function generator means is characterized by being programmable to provide a phase to figure of merit function corresponding to a plurality of predetermined calibration surfaces.

8. A device as defined in claim 7, and wherein:
   said first and second discs each comprise magnet means rotatable therewith; and
   said first and second sensor means comprise first and second magnetic pick-ups mounted on said housing.

9. A device as defined in claim 7 wherein said motor comprises an electric motor, and said device further comprises:
- manually operable switch means for energizing said motor;
- gate means, connected between said comparator means and said function generator means, for passing said third signal only in response to a predetermined gate signal; and
- means for providing said gate signal after said motor has stabilized at said predetermined speed.

10. A device as defined in claim 9, and wherein:
- said housing comprises a recess having an open side adapted to be closed by said test surface, a watertight chamber separated from said recess;
- said motor being disposed in said chamber and having said shaft extend into said recess; and
- said discs being disposed in said recess with said second disc presenting one face thereof to said open side of said recess.

11. A diagnostic tool for measuring the degree of fouling of the hull of a ship, said tool comprising:
- a housing having a cylindrical recess defined therein that is open at one end and adapted to be closed by placement of said housing against a test surface, said housing also having a watertight chamber defined therein and separated from said recess;
- an electric motor mounted in said chamber and comprising a tubular rotary shaft extending into said recess;
- a first disc disposed in said recess and fixed to the outer end of said tubular shaft for rotation therewith;
- a second disc disposed in said recess in spaced, parallel and coaxial relatin to said first disc and having one face lying in a plane adjacent said open end of said recess;
- an elongated, torsionally resilient member having one end fixed to said second disc and extending coaxially into the lumen of said tubular shaft, said torsionally resilient member having its other end fixed within said tubular shaft whereby said second disc is coupled to said first disc for torsionally resilient displacement relative to said first disc;
- said first and second discs each having a plurality of magnets spaced about their respective peripheries;
- first and second magnetic pick-ups mounted in said housing adjacent the peripheral edges of said first and second discs, respectively;
- motor speed control means, for causing said motor to run at a predetermined speed whereby said first and second magnetic pick-ups produce first and second signals each characterized by the same frequency but having a phase difference related to hydrodynamic drag experienced by said second disc when exposed to said test surface and corresponding in amount to the degree of roughness of said surface;
- signal comparator means responsive to said first and second signals, for providing a third signal corresponding to said phase difference; and
- display means, responsive to said third signal, for providing a visual read-out thereof as a measure of test surface roughness.

12. A tool as defined in claim 11, and further comprising:
- function generator means, responsive to said third signal, for providing a fourth signal representative of a figure of merit of test surface condition as a function of said phase difference; and
- selector means for making said display responsive to said fourth signal so as to provide a read-out of said figure of merit.

* * * * *